United States Patent [19] [11] 4,087,672
Yi [45] May 2, 1978

[54] LASER REMOVAL OF MATERIAL FROM WORKPIECES

[75] Inventor: Alberto Yi, London, England

[73] Assignee: United Kingdom Atomic Energy Authority, England

[21] Appl. No.: 703,196

[22] Filed: Jul. 7, 1976

[30] Foreign Application Priority Data

Jul. 8, 1975 United Kingdom ............... 28722/75

[51] Int. Cl.$^2$ ............................................. B23K 27/00
[52] U.S. Cl. ........................ 219/121 LM; 324/71 E;
324/71 R; 346/76 L; 219/121 EM
[58] Field of Search ............. 324/71 EB, 71 E, 71 R,
324/149, 33; 219/121 L, 121 LM, 121 EB, 121
EM; 346/76 L

[56] References Cited

U.S. PATENT DOCUMENTS

| 3,168,418 | 2/1965 | Payne, Jr. ................... 219/121 L |
| 3,291,959 | 12/1966 | Schleich ...................... 219/121 EM |
| 3,297,944 | 1/1967 | Nektardes et al. ..................... 324/33 |
| 3,303,319 | 2/1967 | Steigerwald ................. 219/121 EM |
| 3,316,386 | 4/1967 | Yaffe et al. ........................ 324/33 X |
| 3,347,701 | 10/1967 | Yamagishi et al. .......... 219/121 EM |
| 3,439,263 | 4/1969 | Broyles, Jr. ....................... 324/149 X |
| 3,636,251 | 1/1972 | Daly et al. ..................... 346/76 L X |

FOREIGN PATENT DOCUMENTS 2,538,660  3/1976  Germany ........................ 219/121 L

OTHER PUBLICATIONS

IBM—"Control of Evaporant in Vacuum from Output of Laser" by Potts et al., 7-1965, vol. 8, #2.

Primary Examiner—J. V. Truhe
Assistant Examiner—Mark Paschall
Attorney, Agent, or Firm—Weingarten, Maxham & Schurgin

[57] ABSTRACT

To ascertain the beam intensity threshold at which the intensity of a laser beam will just be sufficient to engrave a workpiece, the value of a beam-intensity control signal is progressively increased or decreased until engraving starts or stops, this being sensed by detecting the initiation or termination of ionization which occurs when the beam intensity is above the threshold value adjacent a part of the workpiece which is being subjected to the action of the laser beam.

9 Claims, 1 Drawing Figure

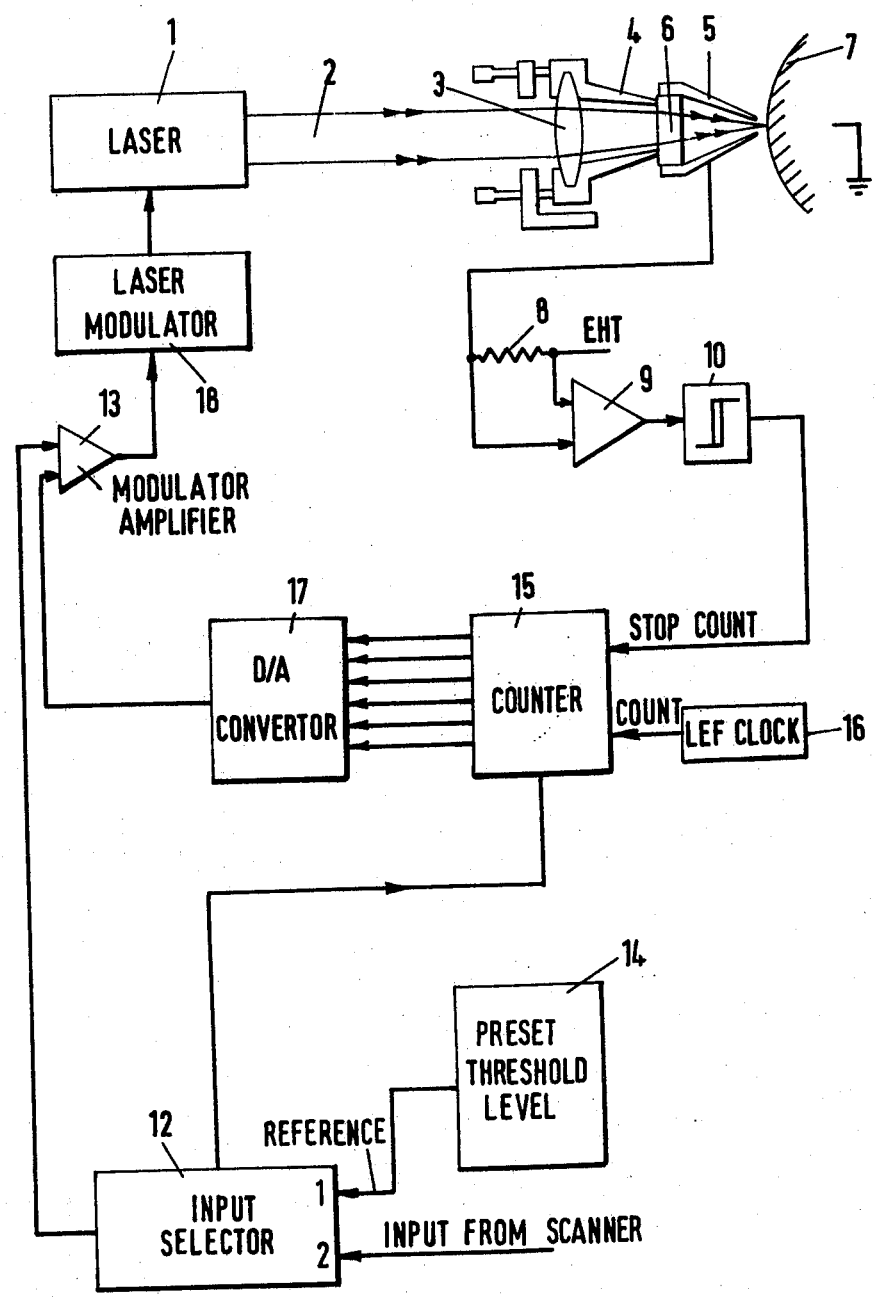

LASER REMOVAL OF MATERIAL FROM WORKPIECES

This invention is concerned with processes and apparatus for removing material from a workpiece by means of a laser, such as the laser engraving of a printing cylinder, and in particular with the detection of the threshold level of beam intensity at which the beam power is just enough to remove material from the workpiece and below which the workpiece is heated without the removal of material.

The present invention consists in a method of ascertaining, for apparatus in which the beam of a laser engraves a workpiece, the value of a beam-intensity control signal which corresponds to a beam-intensity at the engraving threshold for the material of the workpiece, comprising placing at least one conductive probe close to a part of the workpiece on which the laser beam is incident, progressively altering the value of the control signal and detecting the passage of current through a circuit containing the probe to ascertain the value of the control signal for which there is a change from non-ionisation of the gaseous medium adjacent the said workpiece part to ionisation thereof, or vice versa. The threshold of laser beam power required to cause removal of materials from the workpiece, is one of the most important parameters to be determined in a laser engraving system or in any system concerned with the laser processing of material.

The invention is most advantageously employed when the workpiece is made of a conducting material, since then a single probe can be used and this probe can in fact be a nozzle surrounding the laser beam. Thus in the context of printing cylinders, a single probe can be used when the cylinder is of metal but has in its cylindrical surface pre-formed recesses or cells of the maximum printing depth which have been filled with plastics material, the cell walls being thus conductive and available to complete the circuit. Such cylinders are engraved by using a modulated laser beam to remove the plastics material from each cell to an extent dependent on the instantaneous power of the modulated beam. For non-conducting workpieces, a pair of probes is required in the vicinity of the incident beam at the workpiece surface.

In one form of apparatus embodying the invention for engraving a printing surface by means of a laser beam which scans the said surface and including a beam intensity control circuit responsive to a varying image-representing signal to provide a varying beam intensity at the said surface and, when the intensity is above an excavation threshold for the material of the printing surface, to cause different amounts of material to be removed from different parts of the surface, the beam intensity control circuit is additionally responsive to a calibrating signal. A calibration circuit for determining the required value of the calibrating signal comprises: at least one conductive probe in a probe circuit such as to pass current when the probe is placed in a region of ionisation close to a part of the printing surface from which material is being excavated by means of a laser beam; means for applying to the beam intensity control circuit a test signal which changes in value during calibration; and means operative when the output of the probe circuit indicates that at an instantaneous value of the test signal the beam intensity has reached the said excavation threshold, to cause to be applied to the beam intensity control circuit, during engraving under the control of the image-representing signal, a calibrating signal having a value which, at least when the image-representing signal has a desired value for which the beam intensity is to be at the excavation threshold, is equal to the difference between the said instantaneous value of the test signal and the said desired value.

The test signal may comprise a reference signal having the said desired value and a progressively changing signal, the said value of the calibrating signal being equal to the instantaneous value which the progressively changing signal had reached when the output of the probe circuit indicated that the beam intensity had reached the excavation threshold.

In order that the invention may be better understood, one example of apparatus embodying the invention will now be described with reference to the accompanying drawing, which illustrates the application of the invention to the engraving of a printing surface.

In the drawing, a laser 1 directs a beam 2 through a lens 3 in a mounting 4 which is separated from a conductive nozzle 5 by means of an insulator 6. The beam emerging from the nozzle 5 falls on the surface of a conductive cylinder 7, the printing surface of which is to be engraved by the laser.

An EHT voltage is applied to the conductive nozzle through a resistor 8 and a differential amplifier 9 senses the passage of current through the resistor 8. The cylinder shaft is connected to earth. The passage of current through resistor 8 indicates that the gaseous medium between the end of nozzle 5 and the surface of the cylinder 7 is ionised, this ionisation occurring only when the intensity of the laser beam is such as to excavate material from the surface. The output of the differential amplifier controls a Schmitt trigger circuit 10 which provides a signal having one of two levels and indicating thereby whether the intensity of the laser beam is above or below the excavation threshold.

To calibrate the system, an input selector 12 is switched from its normal position, in which it applies an image-representing signal derived from a scanner to a modulator amplifier 13, to a second position in which it applies a reference signal from a preset threshold level circuit 14 to the modulator amplifier 13. The application of the reference signal to the modulator amplifier presets a counter 15 to zero and causes the counter to start counting clock pulses from a reference clock 16. The counter output is applied through a digital-to-analogue converter 17 to another input of the modulator amplifier 13 and consequently as the count increases the offset level applied to the modulator amplifier is raised and the signal to the laser modulator 18 increased.

The output of the Schmitt trigger circuit 10 is connected to the counter and when the input level indicates that a current flow has been detected in the probe circuit, the counter is stopped by the Schmitt signal and the existing offset continues to be applied to the modulator amplifier as a calibrating voltage, until the apparatus is re-calibrated.

Typically, the counter requires about six bits; with a six-bit system the threshold can be set to 2% of its required value. Obviously, greater accuracy can be obtained at will.

In the system described above, a reference voltage is applied to the modulator amplifier as an alternative to the input from the scanner. However, in another possible arrangement, a calibrating cycle is started whenever the image-representing signal from the scanner is known to be at the required threshold level for a period sufficient to enable the measurement to be carried out.

Once the threshold power level has been detected, the range of laser powers required to provide a given tonal range in an image printed from the engraved cylinder can be calculated.

In the above example, during calibration the reference signal from the input selector 12 and the analogue signal from the converter 17 are together applied to the beam intensity control circuit constituted by the modulator amplifier 13 and the laser modulator 18. When the excavation threshold is detected the reference signal is replaced by the image-representing signal from the scanner so that during workpiece engraving this image-representing signal is applied to the beam intensity control circuit with the output of the digital-to-analogue converter 17, which now has a steady value. It will be clear that if desired a single progressively changing test signal could be applied to the beam intensity control circuit; in such a case, the value of the calibration signal to be applied with the image-representing signal during workpiece engraving is given by the difference between the value which the single test signal had when the excavation threshold was reached and the reference value which the input to the beam intensity control circuit is required to have at the excavation threshold of the beam intensity.

It is convenient to use the protective lens nozzle as part of the probe but it will be clear that it is alternatively possible to use an independent probe.

Although the invention has been described in detail in connection with the engraving of a printing cylinder, it will be clear that it is also applicable to any laser machining process and that the data obtained will enable more efficient use of laser power in such a process.

What we claim is:

1. Apparatus for engraving a printing surface by means of a laser beam which scans said surface, said apparatus including a beam intensity control circuit responsive to a varying image-representing signal to provide a varying beam intensity at said surface and, when the intensity is above an excavation threshold for the material of said printing surface, to cause different amounts of material to be removed from different parts of said surface, said beam intensity control circuit additionally comprising:

at least one conductive probe positioned in a region of ionisation close to a part of said printing surface from which material is being excavated by means of said laser beam;

a probe circuit in which said probe is connected, said probe circuit passing current when said probe detects ionisation of said material;

means for applying to said beam intensity control circuit a test signal which changes in value during calibration;

calibrating means provided with a reference signal the value of which represents the image signal level which is desired to correspond to the excavation threshold for the material, said calibrating means operating in a first mode to control the beam intensity in accordance with a progressively changing test signal and operating in a second mode to control the beam intensity jointly in accordance with the image-representing signal and a calibrating signal; and means responsive to the value of the test signal at the excavation threshold during operation of said calibrating means in the first mode to determine the value of the calibrating signal as a function of the difference between the value of the test signal and the reference signal level.

2. Apparatus in accordance with claim 1, in which the said test signal comprises a reference signal having the said desired value and a progressively changing signal, the said value of the calibrating signal being equal to the instantaneous value which the progressively changing signal had reached when the output of the probe circuit indicated that the beam intensity had reached the excavation threshold.

3. Apparatus according to claim 1, including a selector circuit operable to apply to the beam intensity control circuit a signal selected from an image-representing signal and a reference signal having the desired threshold value.

4. Apparatus in accordance with claim 2 including, for changing the value of the said progressively changing signal, a counter connected to receive the output of a clock pulse generator and a digital-to-analogue converter receiving the output of the counter and applying a corresponding analogue signal to the beam intensity control circuit, the counter being responsive to the output of the probe circuit to stop counting.

5. Apparatus in accordance with claim 1, including a single conductive probe, the probe circuit being adapted to include a metal member carrying the said printing surface.

6. Apparatus according to claim 1, including a pair of probes, both arranged to be directed at the same area of the printing surface on which the laser beam is incident.

7. A method of ascertaining, for apparatus in which the beam of a laser engraves a workpiece, the value of a beam-intensity calibrating signal which corresponds to a beam intensity at the engraving threshold for the material of the workpiece, comprising placing at least one conductive probe close to a part of the workpiece on which the laser beam is incident, progressively altering the value of the calibrating signal and detecting the passage of current through a circuit containing the probe to ascertain the value of the calibrating signal for which there is a change from non-ionisation of the gaseous medium adjacent the said workpiece part to ionisation thereof, or vice versa.

8. A method in accordance with claim 7, in which the laser beam passes through a conductive nozzle.

9. Apparatus for removing material from a workpiece by means of a laser beam, comprising, for determining the value of a beam-intensity calibrating signal which corresponds to a beam-intensity at the engraving threshold for the material of the workpiece, ionisation detecting means including at least one conductive probe connected in a circuit such as to pass current when the probe is placed close to a part of the surface from which material is removed by means of the laser beam, means for progressively altering the value of the beam-intensity calibrating signal and means for ascertaining the value of the calibrating signal for which the initiation or termination of the passage of current through the said circuit is detected.

* * * * *